April 24, 1951     D. C. WARREN     2,549,951
SWIVEL JOINT FOR FLUID CONDUITS
Filed Feb. 2, 1948
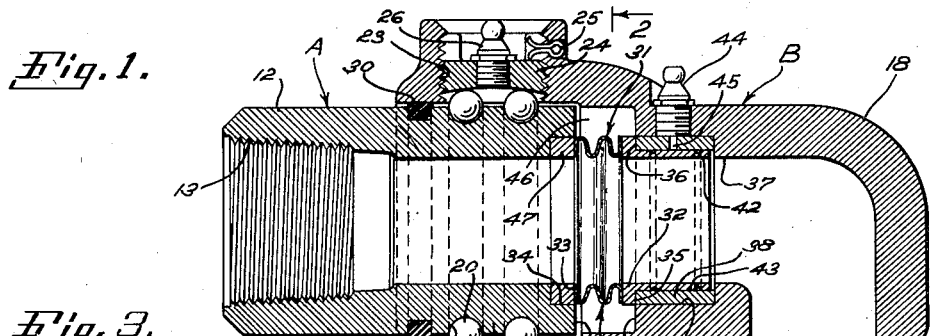
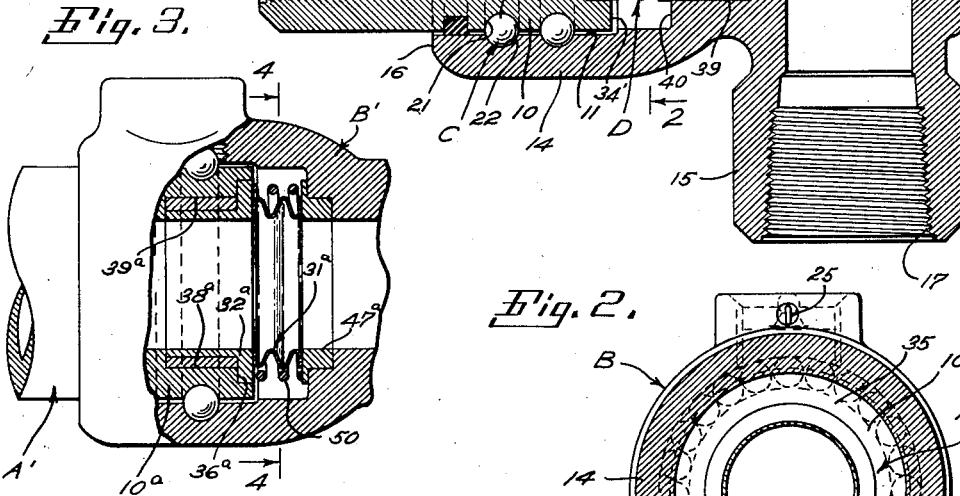
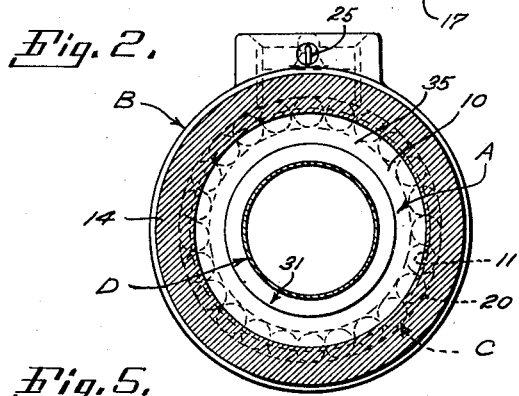
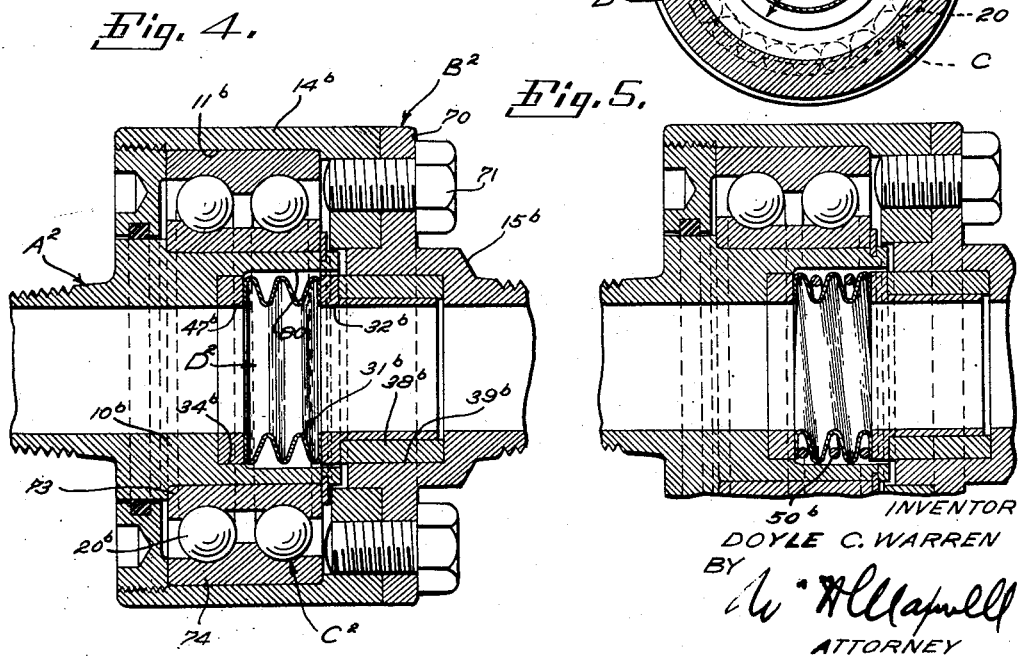
INVENTOR
DOYLE C. WARREN
BY
ATTORNEY Patented Apr. 24, 1951

2,549,951

UNITED STATES PATENT OFFICE 2,549,951

SWIVEL JOINT FOR FLUID CONDUITS

Doyle C. Warren, Monrovia, Calif., assignor to Chiksan Company, Brea, Calif., a corporation of California Application February 2, 1948, Serial No. 5,872

13 Claims. (Cl. 285—97.3)

This invention has to do with a swivel joint for fluid conduits and it is a general object of the invention to provide a simple, practical, highly dependable swivel joint or connection for fluid conduits that will handle a wide variety of liquids or fluids and which will maintain a fluid tight connection under severe operating conditions.

A general object of the present invention is to provide a swivel joint of the general character referred to with a seal that effectively maintains a fluid tight connection between the relatively moving parts which seal does not require packing and maintains a pressure engagement between the sealing parts under all working conditions.

A further object of the present invention is to provide a joint construction of the general character referred to including a seal which maintains tight sealing engagement between the sections or relatively moving parts even though there may be slight misalignment of the parts or possibly shifting of the parts due to wear or clearance that may occur in the structure.

A further object of the present invention is to provide a seal for sections of a swivel connection characterized by a bellows which normally exerts pressure in a manner to maintain tight sealing engagement between the relatively moving parts.

Another object of the invention is to provide a seal of the general character referred to including a resilient element preferably a spring which supplements the action of the bellows in maintaining tight connection between the working parts.

It is another object of the invention to provide a swivel connection of the general character referred to including a male section engaged in the socket of a female section with a sealing bellows located between the inner end of the male section and the bottom of the socket in the female section, while a simple anti-friction coupling means of minimum diameter joins the sections for free relative rotation.

It is a further object of the present invention to provide a swivel connection of the general character referred to including a male section engaged in the socket of a female section and having a sealing bellows carried within the portion of the male section that is held in the socket of the female section while an anti-friction coupling means surrounds the said portion of the male section and is carried within the socket of the female section.

The various objects and features of my invention will be fully understood from the following detailed description of typical preferred forms and applications of the invention, throughout which description reference is made to the accompanying drawings, in which:

Fig. 1 is a sectional view of a typical swivel joint or swivel connection incorporating a typical form of the present invention. Fig. 2 is a transverse sectional view taken as indicated by line 2—2 on Fig. 1. Fig. 3 is a side elevation of a swivel joint or connection incorporating the present invention, certain of the parts being broken away to show the details of construction. Fig. 4 is a longitudinal sectional view of a swivel joint or connection incorporating another form of the present invention, and Fig. 5 is a view of a portion of a joint construction similar to that shown in Fig. 4 but incorporating a slightly different form of the structure provided by the invention.

The construction provided by my present invention is applicable, generally, to swivel or rotating connections provided between fluid conducting parts or elements and the invention is capable of being incorporated in various forms and it may be applied to a joint or swivel connection in various manners. In the drawings I have shown several different joint constructions with different forms of construction embodying the present invention and showing different manners of application of the present invention to the joint constructions.

Referring specifically to the form of the invention illustrated in Figs. 1 and 2 of the drawings the structure involves two tubular sections A and B, the section A being a male section with an inner end portion 10 entered in the socket 11 of the section B, the section B being a female section. The structure further includes means C rotatably coupling the sections A and B and sealing means D establishing a leak-proof connection between the sections A and B, the means D being mounted or carried within the assembly established by the sections A and B.

The male section A is shown as a simple, straight, tubular part having an inner end portion 10 to fit the socket 11 of the female section with suitable clearance and having an outer end portion 12 preferably provided with means for establishing connections with a fluid conductor such as a pipe or the like. In the particular case illustrated the outer end portion 12 is internally threaded at 13 to receive a pipe, or the like.

The female section B in the particular case under consideration is a tubular part L-shaped in form having an inner end or socket portion 14 and an outer end portion 15. The socket end 14 of section B has the socket 11 entering it from its outer end 16 while the outer end portion 15 of section B is preferably provided with means for making connections with a pipe, or the like. In the drawings section 15 is shown with an internal thread 17 for the reception of a pipe or like member. The portions 14 and 15 of section B are shown angularly related or at right angles to each other, in which event they are joined by a curved neck portion 18.

The means C rotatably coupling the sections A and B is preferably an anti-friction means and in the particular case under consideration it involves two rows of balls 20 arranged between the end portion 10 of section A and the socket portion 14 of section B. The means C is a simple, compact construction the balls 20 being carried in grooves 21 provided in the exterior of the portion 10 of section A and grooves 22 provided in the interior of the socket 11. The walls of the grooves 21 and 22 are spherically curved and the grooves 21 and 22 register, forming channels for reception of the balls 20. A lateral access opening 23 is provided in one side of the socket portion 14 of section B having communication with the channels established by the grooves 21 and 22 so that the balls 20 can readily be arranged in and removed from the channels. A closure, preferably in the form of a plug 24, normally closes the opening 23 and it is preferably locked against displacement by a releasable fastener such as a key 25.

In the preferred construction a lubricant connection or fitting 26 is provided in the plug 24 so that suitable lubricant can be introduced to the balls 20. It is preferred, in practice, that a lubricant and dust seal be provided between the parts 10 and 14 to prevent lubricant from escaping from between these parts and to prevent dust or foreign matter from entering between them. As shown in the drawings this seal may involve a sealing ring 30 between the outer end portion of socket part 14 and the part 10 where it enters the socket.

The sealing means D provided by the present invention and in the form under consideration is characterized by a resilient collapsible conformable member which I will term a bellows and which is under compression between the sections A and B with its ends in sealing engagement with the sections A and B. The bellows 31 is an annular or tubular element preferably formed of thin walled resilient material such as metal and the desired resilience or action may be gained through a corrugated or zigzag construction such as is shown in the drawings and such as is commonly referred to as a bellows construction.

It is preferred in practice that one end of the bellows be sealed with one section of the joint by being fixed thereto while the other end of the bellows is sealed with the other section of the joint through a sliding engagement or fit maintained tight by the resilient action of the bellows so that leakage does not occur at this point. In the case under consideration one end of the bellows is made tight and fixed to one section of the joint through a mounting ring 47 while the other end of the bellows has sealing engagement with the other section of the joint through a sealing ring 32. The mounting ring 47 is permanently fixed to the bellows 33 as by welding, soldering, brazing or other suitable construction and the ring 47 is fixed in section A. The ring 47 is shown held tight in a counterbore 34 provided in the inner end 34' of section A. The ring 47 may have a press-fit in the counterbore 34 so that no leakage occurs around or between the ring and section A.

The sealing ring 32 is provided with a sealing face 35 engageable with a sealing face 36 provided in section B surrounding the flow passage 37 that extends therethrough. In the particular case illustrated the sealing face 36 is at or flush with the bottom of the socket 11 in section B, the face 35 at face 36 being in a plane transverse of or normal to the axis of the flow passage 37 where it communicates with the socket 11 in part 14 of section B. It will be apparent from Fig. 1 of the drawings that the bearing or sealing ring 32 may seat or bear directly upon the bottom of socket 11 or, as shown in the drawings, it may bear on a seat ring 38 provided in the section B. The seat ring 38 is shown mounted in a counterbore 39 extending into the section B from the bottom 40 of the socket 11. The seat ring may be pressed into the counterbore 39 so that it is tight therein.

The seal or sealing engagement between the ring 32 and the seat or member B may be confined to the faces 35 and 36 or, as shown in the drawings, additional sealing engagement may be established by providing the sealing ring 32 with a tubular extension 42 that slidably fits into the inside or bore 43 of the seat ring 38.

As a means of lubricating the seal ring 32 with its extension 42 where it operates relative to the seat ring 38, lubricant may be introduced between these parts or at the relatively working surfaces. I have shown a lubricant fitting 44 at the exterior of the section B and through which lubricant can be introduced to a port 45 communicating with the interior of the seat ring 38 where the extension 42 enters the ring 38. It will be apparent that lubricant introduced through the fitting 44 will lubricate and aid in sealing between the members 32 and 38.

In the particular construction above described the principal element or bellows 31 of means D is confined to or carried in a chamber 46 established between the inner end 35 of the section A and the bottom 40 of the socket in section B, and the space between these parts is such that the bellows is normally compressed somewhat so that it exerts pressure on the sealing ring 32 holding the face 35 in pressure engagement with the face 36 so that a seal is maintained between these faces at all times even though there may be slight shifting of working between the sections A and B in the course of rotation between them. With this particular arrangement of parts the bellows 31 is beyond the inner end of the inner end portion 10 of section A, making it possible to employ the form of coupling means C above described, with the result that the structure can be compact or small in over-all diameter.

In the form of the invention shown in Fig. 3 the construction is essentially the same as that above described except that the mounting ring 47ª instead of being carried by the male section A' is carried by the female section B' while the sealing ring 32ª is carried by and seals against a seat 36ª at the inner end of portion 10ª of section A'. The bellows 31ª in this case has one end fixed to the mounting ring 47ª while the other end is fixed to the sealing ring 32ª. The sealing ring 32ª is shown seated directly against the part 10ª of section A' and also against the end of a seat ring 38ª carried in a counterbore 39ª in the end of part 10ª. It is to be noted that with this arrangement the bellows 31ª is, in effect, fixed or anchored to the section B' while sliding and sealing engagement is established between the bellows and the section A'.

In the form of the invention just described the action of the bellows 31ª is supplemented by a resilient member 50, preferably in the form of a helical spring surrounding the bellows with one end bearing on the mounting ring 47ª and the other end bearing on the sealing ring 32ª. In this case the spring 50 is shown fully surrounding the bellows and somewhat larger in diameter than the bellows, in which case the rings 47ª and 32ª project somewhat beyond or radially outward of the bellows to form seats against which the ends of the spring bear.

When the parts are in working position, as shown in Fig. 3, the spring 50, like the bellows 31ª is under some compression so that it yieldingly urges the sealing ring 32ª against the parts with which it seals. It is to be observed that the sealing ring 32ª in this case has an extension 42ª that extends into the seat ring 38ª substantially the same as in the construction first described.

In the form of the invention illustrated in Fig. 4 of the drawings, the male section A² extends into a socket portion 14ᵇ of the female section B² and the sealing means D² acting between the sections A² and B² is carried within the inner end portion 10ᵇ of the male section. In this case the female section B² is shown as a straight tubular part and not L-shaped as shown in Fig. 1. Further, the section B² is a fabricated or built up construction wherein the outer end portion 15ᵇ is formed separate from the socket portion 14ᵇ and is joined thereto by a flange 70 and suitable fastening means 71. In this form of the invention the coupling means C² joining sections A² and B² involves balls 20ᵇ carried by the inner and outer races 73 and 74, respectively. The inner race 73 is mounted on the exterior of portion 10ᵇ while the outer race 74 is mounted in the socket 11ᵇ of socket portion 14ᵇ.

The sealing means D² in this form of the invention includes a bellows 31ᵇ with a mounting ring 47ᵇ at one end and a sealing ring 32ᵇ at the other end. The mounting ring 47ᵇ is shown mounted tight or pressed into a bore 34ᵇ at the inner end of the counterbore 80 provided in part 10ᵇ to accommodate the bellows. The sealing ring 32ᵇ fixed on the bellows is shown cooperatively engaged with a seat ring 38ᵇ carried in a counterbore 39ᵇ in section B². The sealing means D² in this form of the invention is substantially the same as that first described except that the bellows 31ᵇ is received in or carried by the counterbore 80 in part 10ᵇ of section A², with the result that the bellows is within the means C² coupling sections A² and B², thus providing a structure that is compact axially although it may be somewhat larger in diameter than the structure shown in Fig. 1.

In the form of the invention shown in Fig. 5 the parts are arranged and related substantially the same as shown in Fig. 4 except that a resilient element 50ᵇ is provided to supplement the action of the bellows. In this case the bellows is helically formed and the element 50ᵇ is a helical spring corresponding in pitch with the bellows and seated in or meshed with the bellows. With this form of construction the resilient member 50ᵇ may be employed in connection with the bellows without adding to the over-all diameter of the construction and it will be apparent from Fig. 5 of the drawings that the member or spring 50ᵇ in this case will serve most effectively in supplementing the action of the spring in holding the seal tight under working conditions.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A flow conducting structure of the character described including, two tubular sections with concentric flow conducting passages and having axially spaced walls extending radially outward from the passages defining an annular inwardly opening chamber, means rotatably coupling the sections, packing means sealing between the sections including, a tubular flow conducting bellows having a mounting ring at one end secured to one section and having a sealing ring at the other end having sealing engagement with the other section, the said other section having a seat ring fixed therein with one end engaged by the sealing ring and the sealing ring having a tubular extension rotatably received in the seat ring, and means conducting lubricant to the point of engagement between the extension and seat ring.

2. A flow conducting structure of the character described including, two tubular sections with concentric flow conducting passages and having axially spaced walls extending radially outward from the passages defining an annular inwardly opening chamber, anti-friction means rotatably coupling the sections, and sealing means between the sections axially removed from the means coupling the sections, including, a tubular flow conducting bellows of substantially the same internal diameter as the said passages, a mounting ring on one end of the bellows and held by one section, a seat ring on the other end of the bellows and slidably engaged with the other section, a helical spring surrounding the bellows to be clear thereof and cooperating with the bellows in holding the sealing ring engaged with said other section.

3. A flow conducting structure of the character described including, two tubular sections with concentric flow conducting passages and having axially spaced walls extending radially outward from the passages defining an annular inwardly opening chamber, means rotatably coupling the sections, and sealing means between the sections, and within the means coupling the sections and including, a tubular flow conducting bellows of substantially the same internal diameter as the said passages, a mounting ring on one end of the bellows and held by one section, a seat ring on the other end of the bellows and slidably engaged with the other section, and a helical spring surrounding the bellows and cooperating with the bellows in holding the sealing ring engaged with said other section.

4. A flow conducting structure of the character described including, a female section having a flow passage therethrough with a socket entering it from one end, a male section having a flow passage therethrough of substantially the same diameter as the passage in the female section, the male section having an inner portion received in the socket, means within the socket and surrounding the said inner portion of the male section rotatably coupling the sections, and sealing means between the sections at a point axially removed from the means coupling the sections and including, a tubular flow conducting bellows of substantially the same internal diameter as said passages and located between the inner end of said portion of the male section and the bottom of the socket in the female section, a mounting ring on one end of the bellows and held by one section and a sealing ring on the other end of the bellows having sealing engagement with the other section.

5. A flow conducting structure of the character described including, a female section having a flow passage therethrough with a socket entering it from one end, a male section having a flow passage therethrough and having an inner portion received in the socket, means in the socket and surrounding said portion of the male section rotatably coupling the sections, and sealing means including, a tubular flow conducting bellows located within the inner end of said portion of the male section and opposite the bottom of the socket in the female section, a mounting ring on one end of the bellows and held by the male section and a sealing ring on the other end of the bellows having sealing engagement with the female section.

6. A flow conducting structure of the character described including, a female section having a flow passage therethrough with a socket entering it from one end, a male section having a flow passage therethrough and having a counterbored inner portion received in the socket, means within the socket rotatably coupling the sections, and sealing means including, a tubular bellows located in the counterbore of the inner end portion of the male section and opposite the bottom of the socket in the female section, a mounting ring on one end of the bellows and held by the male section and a sealing ring on the other end of the bellows having sealing engagement with the female section.

7. A flow conducting structure of the character described including, a female section having a flow passage therethrough with a socket entering it from one end, a male section having a flow passage therethrough and having an inner portion received in the socket, means rotatably coupling the sections, one of the sections having a counterbore therein, a flow conducting bellows in the counterbore having an inside diameter substantially the same as the passages, a mounting member on one end of the bellows and held by one section, and a sealing member on the other end of the bellows having sealing engagement with the other section.

8. A flow conducting structure of the character described including, a female section having a flow passage therethrough with a socket entering it from one end, a male section having a flow passage therethrough and having an inner portion received in the socket, means rotatably coupling the sections including an anti-friction bearing assembly retained on the inner portion of the male section and supported in the socket and a retainer for said unit threaded into said socket, the said portion of the male section having a counterbore therein, a tubular flow conducting bellows in the counterbore having an inside diameter substantially the same as the passages, a mounting member on one end of the bellows and held by one section, and a sealing member on the other end of the bellows having sealing engagement with the other section.

9. A flow conducting structure of the character described including, two tubular flow conducting sections with concentric flow conducting passages of substantially the same diameter and having axially spaced walls extending radially outward from the passages defining an annular inwardly opening chamber, means rotatably coupling the sections, and packing means sealing between the sections including, a tubular flow-conducting bellows extending between said walls and closing said chamber, the bellows having a mounting ring at one end secured to one section and having a sealing ring at the other end having sealing engagement with the other section, the inside diameter of the bellows being substantially the same as that of the said tubular sections.

10. A flow conducting structure of the character described including, two tubular sections with concentric flow conducting passages of substantially the same diameter and having axially spaced walls extending radially outward from the passages defining an annular inwardly opening chamber, anti-friction means rotatably coupling the sections, and packing means sealing between the sections including, a tubular flow conducting bellows having a mounting ring fixed on one end and rigidly secured to one section and having a sealing ring fixed on the other end having sealing engagement with the other section, the said other section having a central axial opening and a seat member tightly mounted in said opening and rotatably receiving the sealing ring.

11. A flow conducting structure of the character described including, two tubular sections with concentric flow conducting passages of substantially the same diameter and having axially spaced walls extending radially outward from the passages defining an annular inwardly opening chamber, means rotatably coupling the sections, and packing means sealing between the sections including, a tubular flow conducting bellows of substantially the same internal diameter as the said passages and having a mounting ring fixed on one end and rigidly secured to one section and having a sealing ring fixed on the other end having sealing engagement with the other section, the said other section having a central axial opening and a seat ring tightly mounted in said opening with one end engaged by the sealing ring, the sealing ring having a tubuluar extension rotatably received in the seat ring.

12. A flow conducting structure of the character described including, two tubular sections with concentric flow conducting passages of substantially the same diameter and having axially spaced walls extending radially outward from the passages defining an annular inwardly opening chamber, means rotatably coupling the sections including, a tubular flow conducting bellows of substantially the same internal diameter as the passages and having a mounting ring fixed on one end and secured to one section and having a sealing ring fixed at the other end having sealing engagement with the other section, the first mentioned section having a bore extending into it from the shoulder thereof and the mounting ring being tight in said bore in the first mentioned section, said other section having a central axial opening with a liner therein receiving the sealing ring.

13. A flow conducting structure of the character described including, two tubular sections with concentric flow conducting passages of substantially the same diameter and having axially spaced walls extending radially outward from the passages defining an annular inwardly opening chamber, means rotatably coupling the sections, and sealing means between the sections, including, a tubular flow conducting bellows having an inside diameter substantially the same as the passages, a mounting ring on one end of the bellows and held by one section, a seat ring on the other end of the bellows and slidably engaged with the other section, and a resilient member in the chamber surrounding the bellows and cooperating with the bellows in holding the sealing ring engaged with said other section.

DOYLE C. WARREN.

REFERENCES CITED

The following references are of record in the file of this patent:

UNITED STATES PATENTS

| Number | Name | Date |
|---|---|---|
| 1,586,725 | Westinghouse et al. | June 1, 1926 |
| 1,702,066 | Valentine | Feb. 12, 1929 |
| 1,759,029 | Wishart | May 20, 1930 |
| 1,883,278 | Zerk | Oct. 18, 1932 |
| 2,100,220 | King | Nov. 23, 1937 |
| 2,396,123 | Phillips | Mar. 5, 1946 |
| 2,444,868 | Allen et al. | July 6, 1948 |